Dec. 12, 1939.     O. E. STUTSMAN ET AL     2,182,828
BICYCLE
Filed June 17, 1937     2 Sheets-Sheet 1
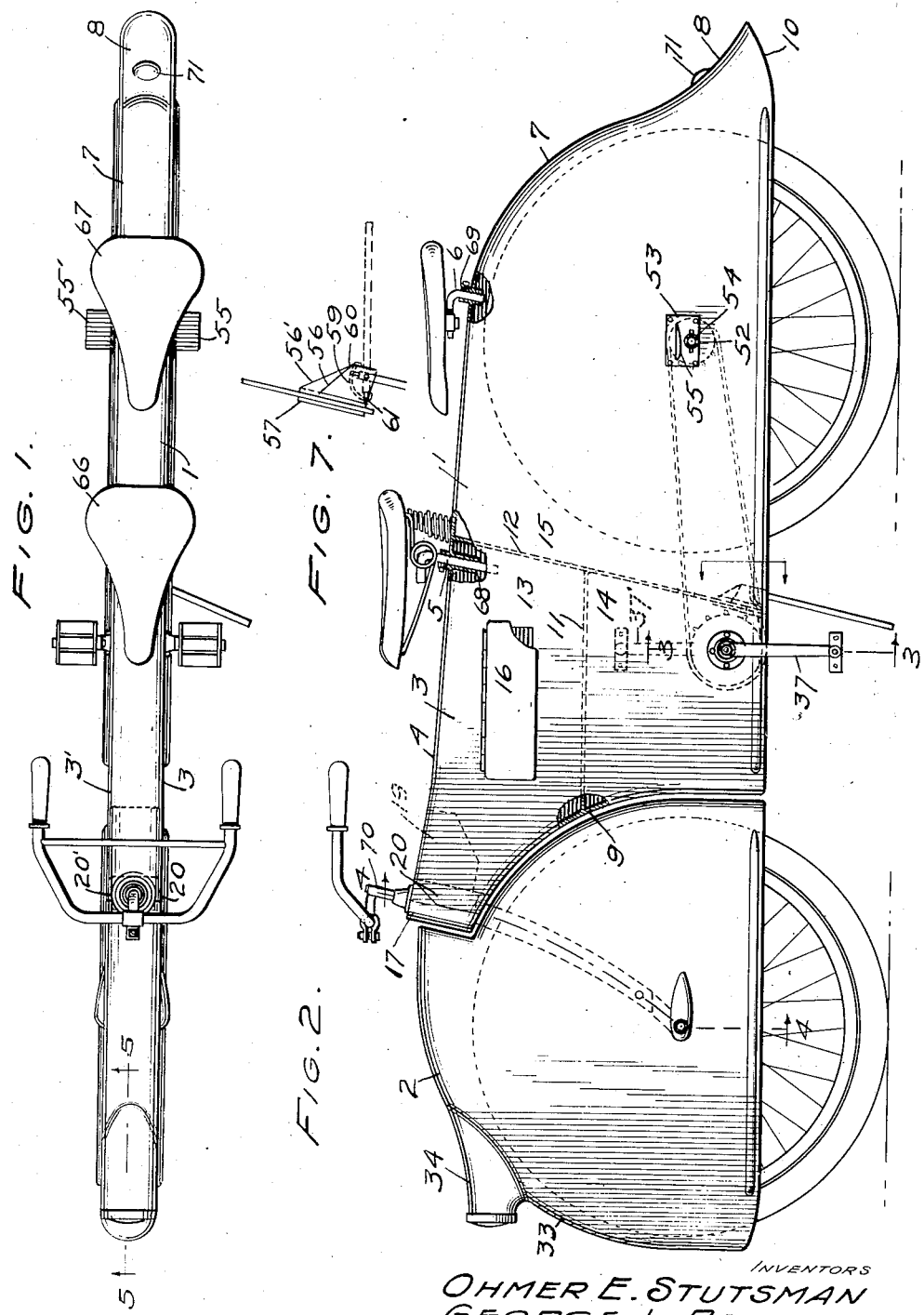
INVENTORS
OHMER E. STUTSMAN
GEORGE L. BECKER
By Adam Richmond
ATTORNEY Dec. 12, 1939. O. E. STUTSMAN ET AL 2,182,828
BICYCLE
Filed June 17, 1937 2 Sheets-Sheet 2
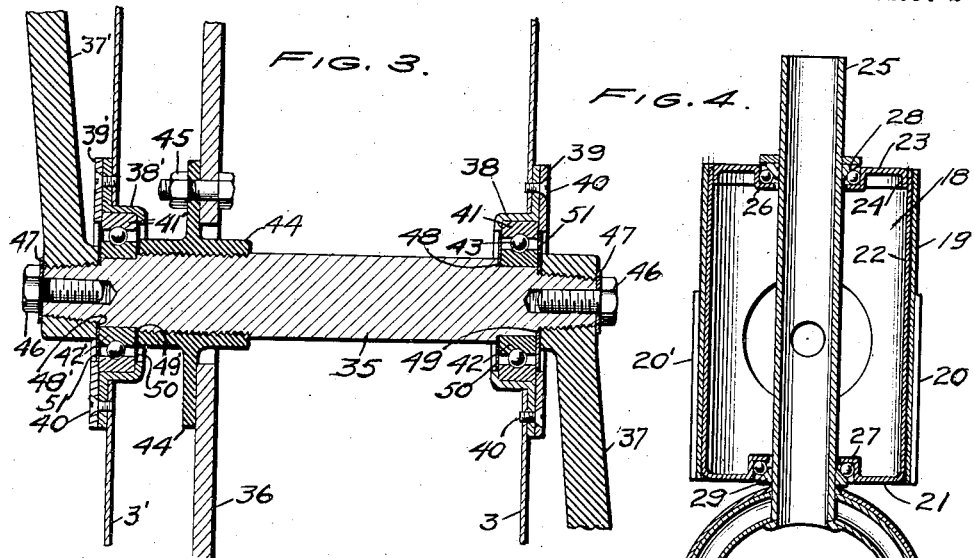
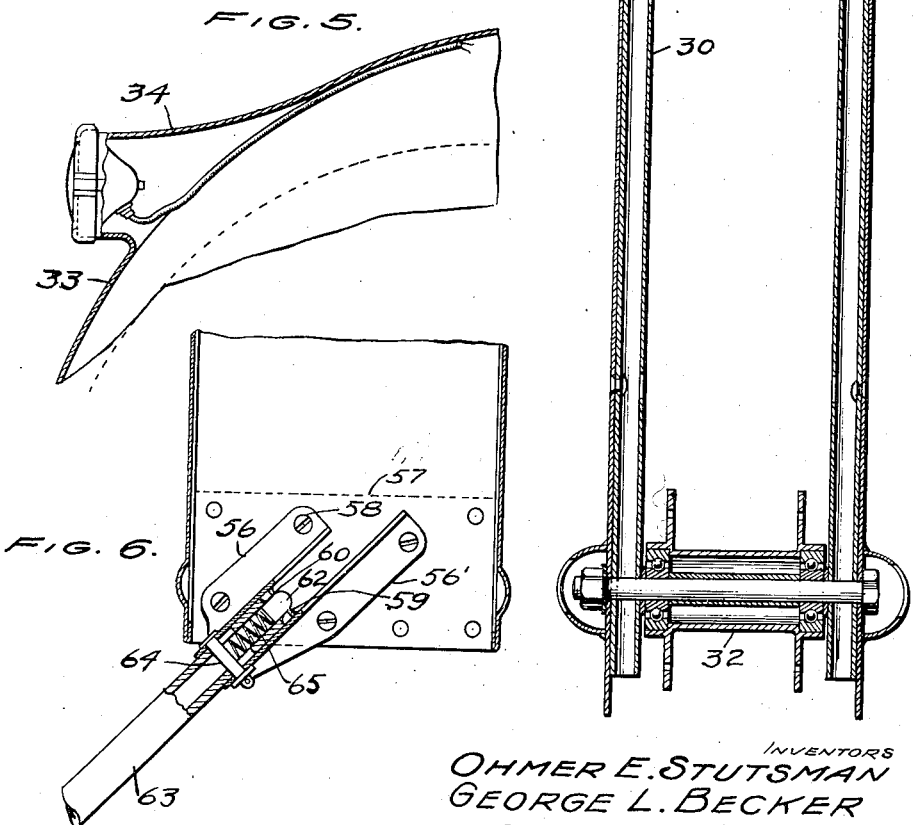
INVENTORS
OHMER E. STUTSMAN
GEORGE L. BECKER
By Adam Richmond
ATTORNEY Patented Dec. 12, 1939

2,182,828

UNITED STATES PATENT OFFICE 2,182,828

BICYCLE

Ohmer E. Stutsman and George L. Becker, Dayton, Ohio

Application June 17, 1937, Serial No. 148,724

4 Claims. (Cl. 280—281)

(Granted under the act of March 3, 1883, as amended April 30, 1928; 370 O. G. 757)

This invention described herein may be manufactured and used by or for the Government for governmental purposes, without the payment to us of any royalty thereon.

This invention relates generally to bicycles, but more particularly to the frame, wheel mountings, steering gear, mud guards and other parts making up the chassis of the bicycle.

One object of this invention is to provide an improved bicycle frame construction, the essential components of which may be made from die formed sheet metal to the general end of decreasing cost of production, enhancing appearances and providing a sturdy construction.

Another object of this invention is to provide a sheet metal bicycle frame formed of a single die stamping and including interacting bulkheads arranged to receive all concentrated loads.

Another object of this invention is to provide a sheet metal bicycle frame having an inclosed transmission mechanism which may be readily disassembled from the exterior of the inclosing structure.

Still another object of the invention is to provide a streamline bicycle chassis which will furnish entire protection to the rider from mud, dust, and grease, and also prevent the accidental entanglement of his clothes with the working parts of the machine.

With these and other objects in view, this invention consists in certain novel details of construction, combination and arrangement of parts to be more fully hereinafter described and set forth in the accompanying claims.

Referring more particularly to the accompanying drawings in which corresponding parts are indicated by similar reference characters:

Fig. 1 is a top plan view showing a bicycle equipped with the improved type of sheet metal chassis;

Fig. 2 is a side elevation of the bicycle with sheet metal chassis shown in Fig. 1;

Fig. 3 is a sectionized view taken on the line 3—3 in Fig. 2, showing the sprocket and sprocket shaft mounted within the chassis;

Fig. 4 is a sectionized view taken on the line 4—4 in Fig. 2, showing the steering fork, front wheel hub mounting, and lateral aprons of the front frame;

Fig. 5 is a sectionized view taken along the line 5—5 in Fig. 1, showing a portion of the front wheel sheet metal frame and integrally formed lamp housing, lamp and conductor cord;

Fig. 6 is a sectionized view taken along the line 6—6 in Fig. 1, showing a rear elevation of the supporting rack; and Fig. 7 is an enlarged side elevation of the supporting rack as shown mounted to the frame of the bicycle.

According to the instant invention the conventional front fork and tubular frame construction of the standard bicycle assembly are replaced with front and rear swivelly connected sheet metal structures, the rear structure which encases the transmission mechanism being formed at its forward end so as to permit turning movement of the front structure and interiorly provided with interacting bulkheads into which the concentrated loads are adapted to be taken, the two structures including hoods embracing and rotatably supporting the front and rear wheels of the bicycle.

It will be noted from illustrations that the front frame, which encased the steering fork members, forms a support for the hub of the front wheel, and also functions as a casing which encloses the upper portion of the wheel. The rear frame forms supports for the hub of the rear wheel, the sprocket shaft bearings, the saddles and the steering column, and functions as a casing for all working parts.

The rear frame which is divided into bulkheads by transverse spacing members or webs, is provided with a luggage compartment for the storage of lighting batteries, tools or other necessary equipment, and baggage.

Referring to the drawings, the numeral 1 indicates the rear frame, and the numeral 2 the forward frame, both of which comprise the entire chassis of the bicycle.

The rear frame is composed of a single, symmetrically cut, metallic sheet; which when folded upon itself along its line of symmetry presents a lateral elevation having the configuration illustrated in Fig. 2. In folding the sheet the bend is rounded at a radius which is adapted to space the parallel sides a suitable distance apart, so that the transmission mechanism and rear wheel may be included in the intervening space and the sprocket bearings and the axle of the rear wheel may be mounted in the side walls of the frame formed by the parallel portions of the sheet.

Bending the sheet in this manner forms parallel side plates 3 and 3' and an intermediate section 4 in which the saddle posts 5 and 6 are mounted.

To enclose the portions of the rear frame adjacent the rear wheel and the forward frame, as indicated by the numerals 7, 8 and 9, the parallel plates are rounded on the same radius as the intermediate portion 4 and welded along their lines of intersection.

At the foremost extremity of the rear frame, as indicated by the numeral 20, the side plates or aprons 3 and 3' extend to embrace the steering head which will hereinafter be described. The lower edges of the aprons extend horizontally from their forward end to the portion adjacent the flared rear extremity where the lower edges curve upward at 10 to meet the curve indicated by the numeral 8.

Within and forward of the rear sheet metal structure or frame are located intersecting bulkheads 11 and 12 to which all concentrated loads are adapted to be conveyed and which divide the interior of said rear frame into upper and lower bulkhead compartments 13 and 14 respectively and a rear-wheel hood section 15, as clearly shown in Fig. 2 of the drawings. Compartment 13 is formed with a suitably dimensioned opening adapted to be closed by the hingedly mounted bar 16 so that it may be utilized as a storage compartment for tools, luggage and the like. Within compartment 14 and hood 16 are located the transmission mechanism and a major portion of the rear wheel.

At the foremost extremity of the rear frame is mounted the steering head 17, illustrated in Figs. 1, 2 and 4, which comprises a steering column 18 and a supporting bracket 19, which encircles the forward portion of the circumference of the steering column to which it is attached, and which extends rearward of the column as bracket plates for attachment to the inner surface of the foremost projecting portion of the rear frame, indicated by the numerals 20 and 20'. With this construction the load absorbed by the shell of the front wheel assembly is radiated from its point of application into the skin or shell of the compartment formed by the bulkheads. The steering column consists of a cylindrical housing having a lower end plate 21 formed integral with tubular side wall 22 and an upper end plate 23 provided with a flange 24 which fits snugly within the cylindrical side wall and to which it may be welded or otherwise suitably attached. The end plates 21 and 23 are each provided with a central circular opening, which openings register with each other, and are adapted for the passage of the fork shaft 25. Around said openings the upper and lower end plates are angularly flanged, as shown at 26 and 27, to form the inner ball races for the ball bearing mounting of the fork shaft. The outer races 28 and 29 are welded to the fork shaft or otherwise suitably attached thereto.

The front or steering wheel of the bicycle is rotatably and pivotally mounted within the fork 30 which is composed of a single tubular member, bent centrally and welded to the lower extremity of the fork shaft 25, as illustrated in Fig. 4.

The forward frame 2 which is fitted to the front wheel comprises a casing 31 which is semi-circular throughout the greater portion of its extent, but which projects downward beyond the wheel hub 32 until its lower edge is level with that of the rear casing 1, and extends upward along an arcuate curve until its topmost extremity lies almost within the level of the member 4 of the rear casing. At the upper forward extremity of this casing the arcuate curve is continued at an opposite radius of curvature to form a lamp shield, as shown at 34.

The driving gear comprising the sprocket shaft 35, the sprocket 36, and the pedal cranks 37 and 37', is mounted on the frame as illustrated in Fig. 3. The bearing supports 38 and 38' and retaining washers 39 and 39' are attached to the side plates 3 and 3' by means of the screws 40. Within the bearing supports 38 and 38' are mounted the outer bearing races 41 and 41'. The inner races 42 and 42' are attached to the sprocket shaft 35 which rotates on the balls 43. The sprocket shaft 35 is threaded for the reception of the flanged sprocket supporting member 44 to which the sprocket 36 is attached by means of the bolts 45, and the sprocket shaft 35 is threaded at its outer extremities for the reception of the pedal cranks 37 and 37', which are locked in place by the studs 46 as they are tightened against the washers 47.

The sprocket shaft is machined to several diameters to provide shoulders at 48 and 48', and 49 and 49', for retention of the inner bearing races 42 and 42', and inner and outer dust washers 50 and 51. Referring to Fig. 3 of the drawings, it will be seen that the sprocket assembly may be dropped from the plates 3 and 3' by removing cranks 37 and 37', screws 40, bearing support 38, retaining washer 39 and then shifting the sprocket shaft 35 to the right until its left end leaves the bearing support 38'. When the left end of the sprocket shaft 35 has been released the right end of said shaft may be moved to the left until it is disengaged from the opening in plate 3, thus releasing the entire sprocket assembly.

The hub shaft 52 of the rear wheel is retained within the rear frame 1 by means of retaining members 53, only one of which is shown in the drawings. These retaining members are rectangular plates which are riveted to the lateral plates 3 and 3' and are provided with circular openings for the reception of the hub shaft which is secured in place by the nuts 54. The retaining plates are also provided with laterally projecting foot rests which are shown at 55 and 55' in Fig. 1.

The bicycle is also provided with a supporting stand which is illustrated in detail in Figs. 6 and 7 and shown in attached position in Figs. 1 and 2. The stand comprises two angular bracket members 56 and 56' which are attached to the rear of the diagonal rear frame member 12 and a braking plate 57 which is riveted thereto by the screws 58.

Between these bracket members is located an arcuate spacing member 59 which is welded or otherwise suitably attached to the bracket members 56 and 56'. This spacing member 59 is provided with circular openings 60 and 61, (see Fig. 7) adjacent each extremity for the reception of a latching pin 62, which will be described further. The supporting leg 63 which is pivotally mounted at one end between the bracket members 56 and 56' comprises a tubular member provided with oppositely located slots adjacent one extremity. These slots are for the reception of the pivot shaft 64 which is provided with a head on one end and a cotter pin hole at the other, and is retained in opposite circular openings in the bracket members. Fitted within the interior of the supporting leg 63 and resting against the pivot shaft 64 is a helical compression spring 65, which presses against the round nosed latching pin 62, which is slidably mounted within the supporting leg. With such an assembly the supporting leg may be retained in either a horizontal or upright position depending on which circular opening 61 or 62 is engaged by the latching pin. To change the position of the supporting leg a pull is first exerted upon it until the latching pin disengages the opening in which it is seated and then the shaft is given an angular movement until the latching pin engages the other opening.

The bicycle is preferably equipped with two saddles 66 and 67 which are supported on saddle 5 and 6 mounted in tubular supports 68 and 69 welded to the intermediate member 4 of the rear frame 1. The handle bar supporting post 70 is mounted within the steering or fork shaft 25 in the usual manner, and retained therein by the usual expanding mechanism used on the standard bicycles. At the rear of the chassis a dome-shaped rear signal lamp may be fitted within the frame as indicated by the numeral 71.

The improved bicycle chassis is streamlined throughout its entire length, being curved in front and at the rear and presenting flat lateral surfaces which lie in parallel planes, broken only by a narrow arcuate and diagonal space between the front and rear frames, to permit pivotal steering movement of the front wheel.

Having described our invention, what we claim as new and wish to secure by Letters Patent is:

1. A bicycle frame comprising a metallic shell presenting in vertical section an inverted U-shaped structure and including parallel side plates cut away at the front of the shell to define a forwardly projecting steering head portion, an intermediate ledge portion interconnecting the side plates along their upper edges, said ledge portion being curved outwardly and downwardly at the rear of the shell to impart a rounded formation thereto, intersecting bulkheads within and coacting with the shell to receive the concentrated loads absorbed by said shell, said bulkheads dividing the interior of the shell into forwardly located bulkhead compartments, and a rearwardly disposed hood adapted to embrace the rear wheel.

2. A bicycle frame comprising a metallic shell presenting in vertical section an inverted U-shaped structure and including parallel side plates cut away at the front of the shell to define a forwardly projecting steering head portion, the edges of said plates at the cut away portion of the shell being united to close the front end of said shell, an intermediate ledge portion interconnecting the side plates along their upper edges and having therein a saddle post opening, a pair of bulkheads within and coacting with said shell to receive the concentrated loads, said bulkheads being arranged in intersecting relation to divide the interior of the shells into forwardly disposed upper and lower bulkhead compartments and a hood for the rear wheel.

3. A bicycle frame formed of a single metal stamping and comprising a shell presenting in vertical section an inverted U-shaped formation, said shell including parallel side plates cut away at the front of the shell to define a forwardly projecting steering head portion, said plates at the cut away portion being rounded and united along their meeting edges, an intermediate ledge portion interconnecting the side plates at their upper edges, said ledge portion having therein a saddle post opening and being curved outwardly and downwardly at the rear of the shell to impart a rounded formation thereto, a pair of bulkheads within and coacting with said shell to receive all concentrated loads, said bulkheads being arranged in intersecting relation to divide the interior of the shell into forwardly disposed upper and lower bulkhead compartments and a hood for the rear wheel.

4. A bicycle chassis comprising a metallic shell including parallel side plates, a rear wheel rotatably mounted within the shell, a front wheel assembly swivelly connected to the forward portion of said shell, a transmission mechanism disposed within and incased by said shell and coacting means in connection with the transmission mechanism and the parallel plates of said shell to permit dissembling of the transmission mechanism from the exterior of the shell.

OHMER E. STUTSMAN.
GEORGE L. BECKER.